US010226736B1

(12) United States Patent
Cottingham

(10) Patent No.: US 10,226,736 B1
(45) Date of Patent: Mar. 12, 2019

(54) SYSTEM AND METHOD FOR INHIBITING WATER CONTAMINATION IN FUEL HOLDING TANK

(71) Applicant: Brent R. Cottingham, Grand Rapids, MI (US)

(72) Inventor: Brent R. Cottingham, Grand Rapids, MI (US)

( * ) Notice: Subject to any disclaimer, the term of this patent is extended or adjusted under 35 U.S.C. 154(b) by 142 days.

(21) Appl. No.: 15/484,978

(22) Filed: Apr. 11, 2017

Related U.S. Application Data

(60) Provisional application No. 62/321,316, filed on Apr. 12, 2016, provisional application No. 62/361,583, filed on Jul. 13, 2016.

(51) Int. Cl.
| | |
|---|---|
| *B65D 88/76* | (2006.01) |
| *B65D 90/34* | (2006.01) |
| *B01D 53/30* | (2006.01) |
| *B01D 53/26* | (2006.01) |
| *B65D 90/10* | (2006.01) |
| *B61D 5/00* | (2006.01) |
| *B60P 3/22* | (2006.01) |

(52) U.S. Cl.
CPC ........... *B01D 53/30* (2013.01); *B01D 53/261* (2013.01); *B01D 53/268* (2013.01); *B65D 88/76* (2013.01); *B65D 90/105* (2013.01); *B65D 90/34* (2013.01); *B01D 2259/4525* (2013.01); *B60P 3/224* (2013.01); *B61D 5/00* (2013.01)

(58) Field of Classification Search
CPC .... B01D 53/30; B01D 53/261; B01D 53/268; B01D 2259/4525; B01D 2259/4566; B60P 3/224; B65D 88/76; B65D 90/105; B65D 90/34; B61D 5/00

USPC ....... 96/4–14, 108, 111, 134; 95/10, 90, 117
See application file for complete search history.

(56) References Cited

U.S. PATENT DOCUMENTS

| | | | |
|---|---|---|---|
| 2,309,813 A | 7/1940 | Whiting | |
| 4,024,848 A | 5/1977 | Lee | |
| 4,809,934 A | 3/1989 | Rix | |
| 5,427,693 A * | 6/1995 | Mausgrover | ........... C01B 13/11 |
| | | | 210/143 |
| 8,499,788 B2 | 8/2013 | Raymo, Sr. | |
| 8,904,669 B2 | 12/2014 | Tichborne et al. | |
| 2016/0102261 A1 | 4/2016 | Lam et al. | |

FOREIGN PATENT DOCUMENTS

| | | |
|---|---|---|
| DE | 2035043 A1 | 1/1972 |
| GB | 2471868 A | 1/2011 |
| KR | 20160092577 A | 8/2016 |

* cited by examiner

*Primary Examiner* — Frank M Lawrence, Jr.
(74) *Attorney, Agent, or Firm* — Gardner, Linn, Burkhart & Ondersma LLP

(57) ABSTRACT

A system for supplying dry air to a fuel tank to remove moisture and inhibit contamination includes a dry air supply assembly having an air compressor and an air dryer configured to remove moisture from air supplied by the air compressor to the air dryer, and includes a fluid pump mounted within the fuel tank above a fuel level, with the fluid pump receiving dried air from the air dryer. A suction line extends from the fluid pump and includes an open end disposed at a bottom of the fuel tank. The fluid pump is adapted to receive dried air from the air dryer as a motive force to draw liquid from the bottom of the tank into the opening and up the suction line to the fluid pump, and discharge liquid from the fluid pump above the fuel level within the fuel tank.

20 Claims, 9 Drawing Sheets

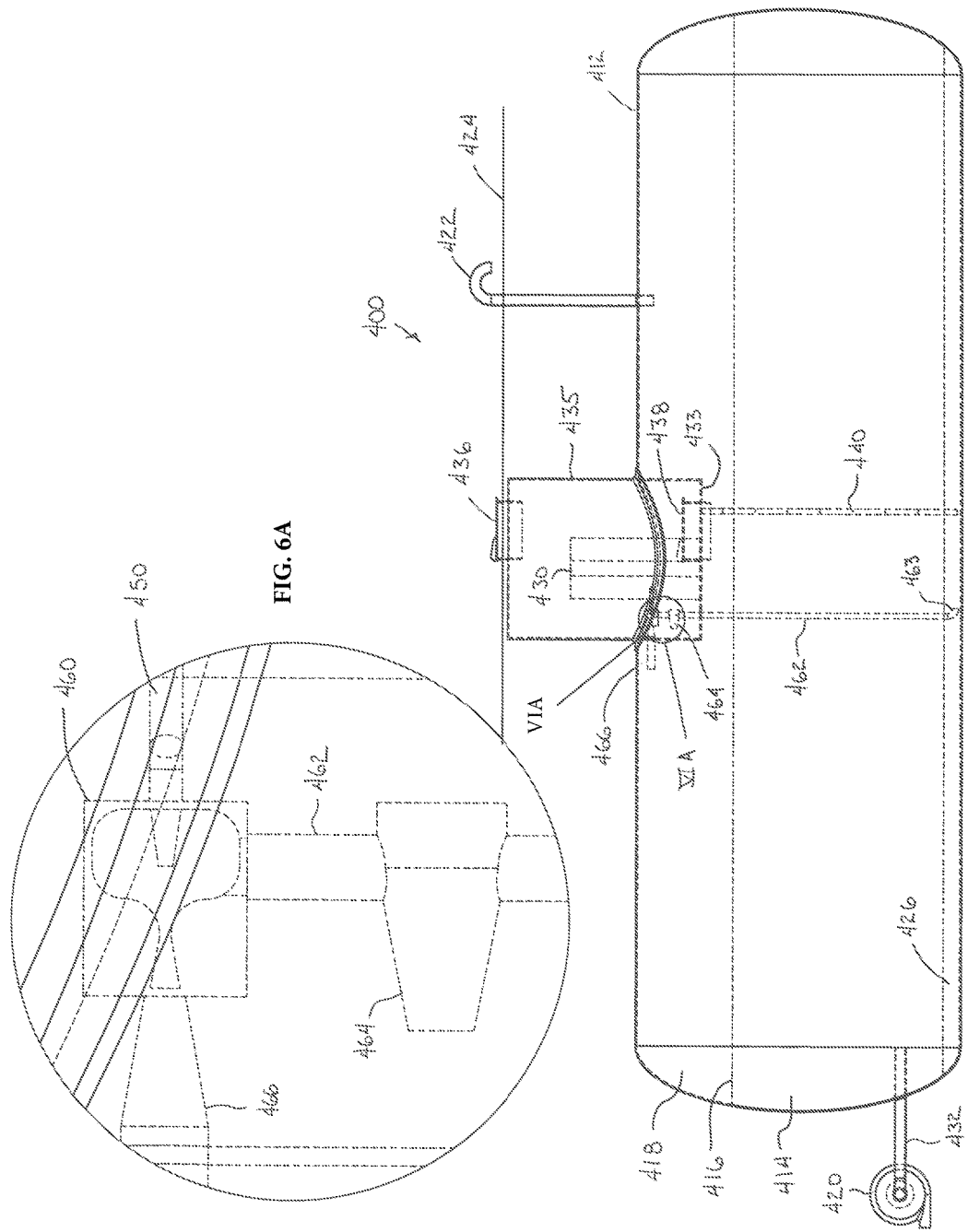

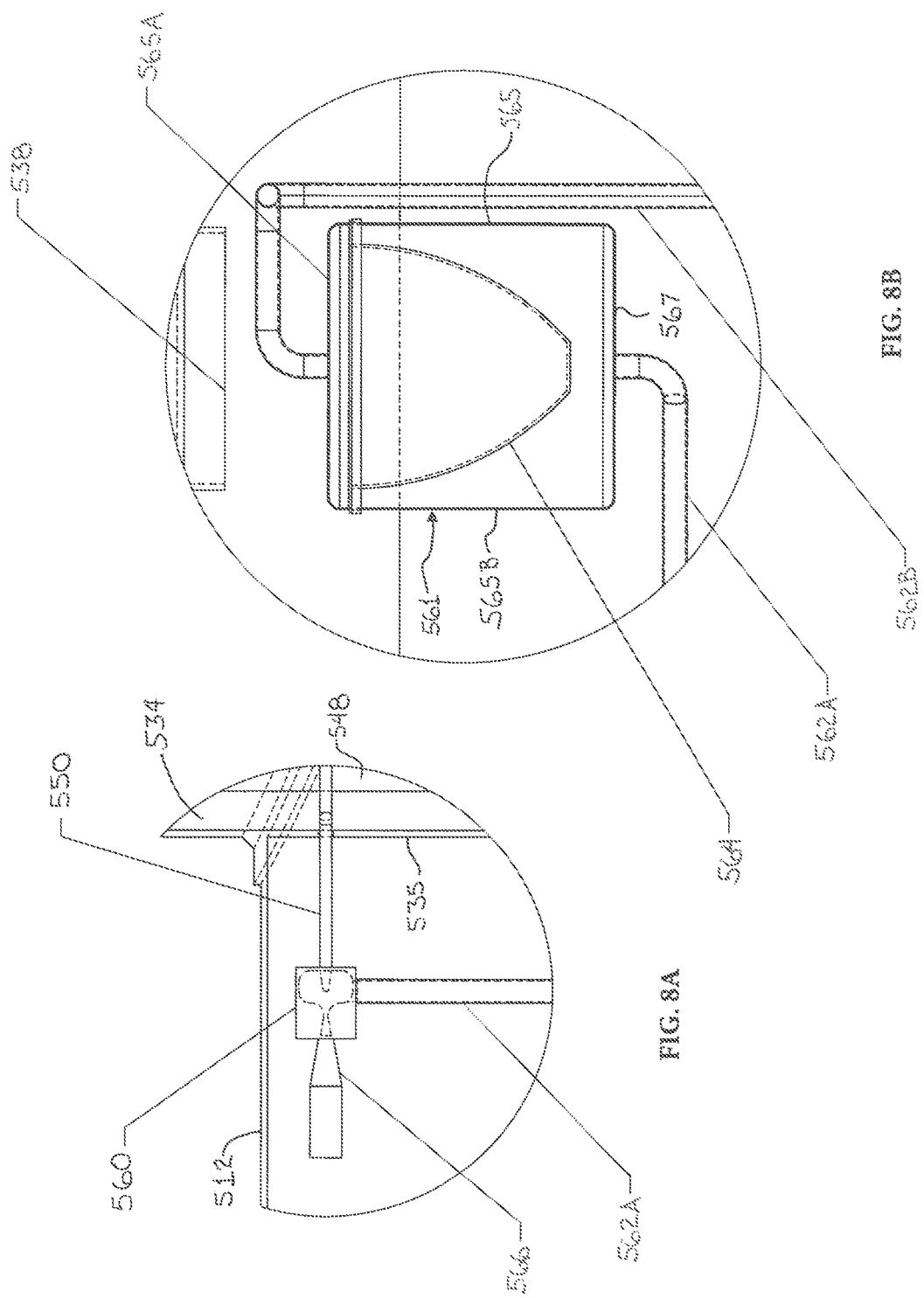

SYSTEM AND METHOD FOR INHIBITING WATER CONTAMINATION IN FUEL HOLDING TANK

CROSS REFERENCE TO RELATED APPLICATION

The present application claims priority of U.S. provisional application Ser. No. 62/321,316 filed Apr. 12, 2016, and claims priority of U.S. provisional application Ser. No. 62/361,583 filed Jul. 13, 2016, which are hereby incorporated herein by reference in their entireties.

BACKGROUND AND FIELD OF THE INVENTION

The present invention is directed to a system and method for supplying dry air to a fuel holding tank to thereby inhibit and/or remove water contamination in the fuel holding tank, in particular to inhibit biological growth propagated by the presence of moisture, such as in a biodiesel fuel holding tank.

Fuels, such as biodiesel fuels, are stored in fuel tanks, such as holding tanks, tanks used to transport the fuels by rail or truck, and tanks mounted to equipment such as vehicles to supply fuel for operation thereof. Biodiesel fuels are more susceptible to the formation of biological growth within the tanks, such as in the form of microbes, mold, mildew, or the like. The contamination in turn can degrade the fuel, as well as impact the performance or damage the equipment being supplied.

SUMMARY OF THE INVENTION

The present invention provides a system and method for supplying dried air to a fuel tank to inhibit biological contamination in the fuel tank.

According to an aspect of the present invention, a system for supplying dry air to a fuel tank comprises a dry air supply assembly that includes an air dryer configured to remove moisture from air drawn into the dry air supply assembly, a dry air supply line operatively connected with the dry air supply assembly whereby the dry air supply line is in fluid communication with the dry air supply assembly, and with the dry air supply line being operatively connected with a fuel tank. The dry air supply line supplies dried air into the fuel tank at a location above a fuel level of the tank, with the fuel tank including a vent to allow air to discharge from the tank. Supplying dried air to the fuel tank, such as to a fuel tank containing biodiesel fuel, inhibits the formation and/or growth of biological materials within the tank by removing moisture from the tank, and may even cause water in the fuel to be drawn out of the fuel.

The dry air supply assembly includes an air compressor that supplies compressed air to the air dryer. In particular configurations, the dry air assembly further includes a regulator to control the flow of dried air from the air dryer, and a controller that is operative to control the operation of the dry air supply assembly.

Various fuel tanks may be equipped with the system of the present invention, including underground storage tanks having manways, as well as transportable fuel tanks mounted to wheels, such as a fuel tank of a fuel tank trailer, a fuel tank of a locomotive fuel tank car, or even the fuel tanks of vehicles themselves. In particular embodiments, the air dryer may be supplied compressed air from the same source that supplies compressed air for air brakes, such as air brakes on a trailer or a locomotive car.

A method of supplying dry air to a fuel tank, or of removing water or moisture from a fuel tank, comprises drying air with an air dryer configured to remove moisture from ambient air to form dried air, supplying dried air into a fuel tank containing fuel, wherein the fuel tank includes a vent and the dried air is supplied above the fuel level in the tank, and discharging air from the fuel tank through the vent.

According to another aspect of the present invention, a fluid pump is provided for a fuel tank for drawing water and/or fuel in the tank to the fluid pump. The fluid pump is supplied with dried air as a motive fluid, such as compressed dried air, to mix with water and/or fuel drawn up by the compressed dried air supplied to the fluid pump. The fluid pump may be used to draw water up from the bottom of a tank to promote the evaporation of the water. The fluid pump may be used to draw fuel to the fluid pump, thereby creating a frothed fuel and promoting the drying of the fuel by removal of water entrained in the fuel.

The present invention provides an effective and efficient system and method to inhibit the formation and/or growth of biological materials within a fuel tank by removing moisture from the tank, and may even cause water in the fuel contained in the tank to be drawn out of the fuel. The system and method will promote the reduction in damage to equipment using the fuel, as well as reduce the need to clean the fuel holding tanks as would otherwise be necessary to remove the biological contamination. These and other objects, advantages, purposes and features of this invention will become apparent upon review of the following specification in conjunction with the drawings.

BRIEF DESCRIPTION OF THE DRAWINGS

FIG. 6 is a side elevation view of the fuel holding tank of FIG. 5;

FIG. 6A is a close-up view of the ejector portion of the system shown in FIG. 6;

FIG. 8A is a close-up view of the ejector portion of the system shown in FIG. 8; and FIG. 8B is a close-up view of a filter assembly of the system shown in FIG. 8.

DESCRIPTION OF THE PREFERRED EMBODIMENTS

Figure 1:
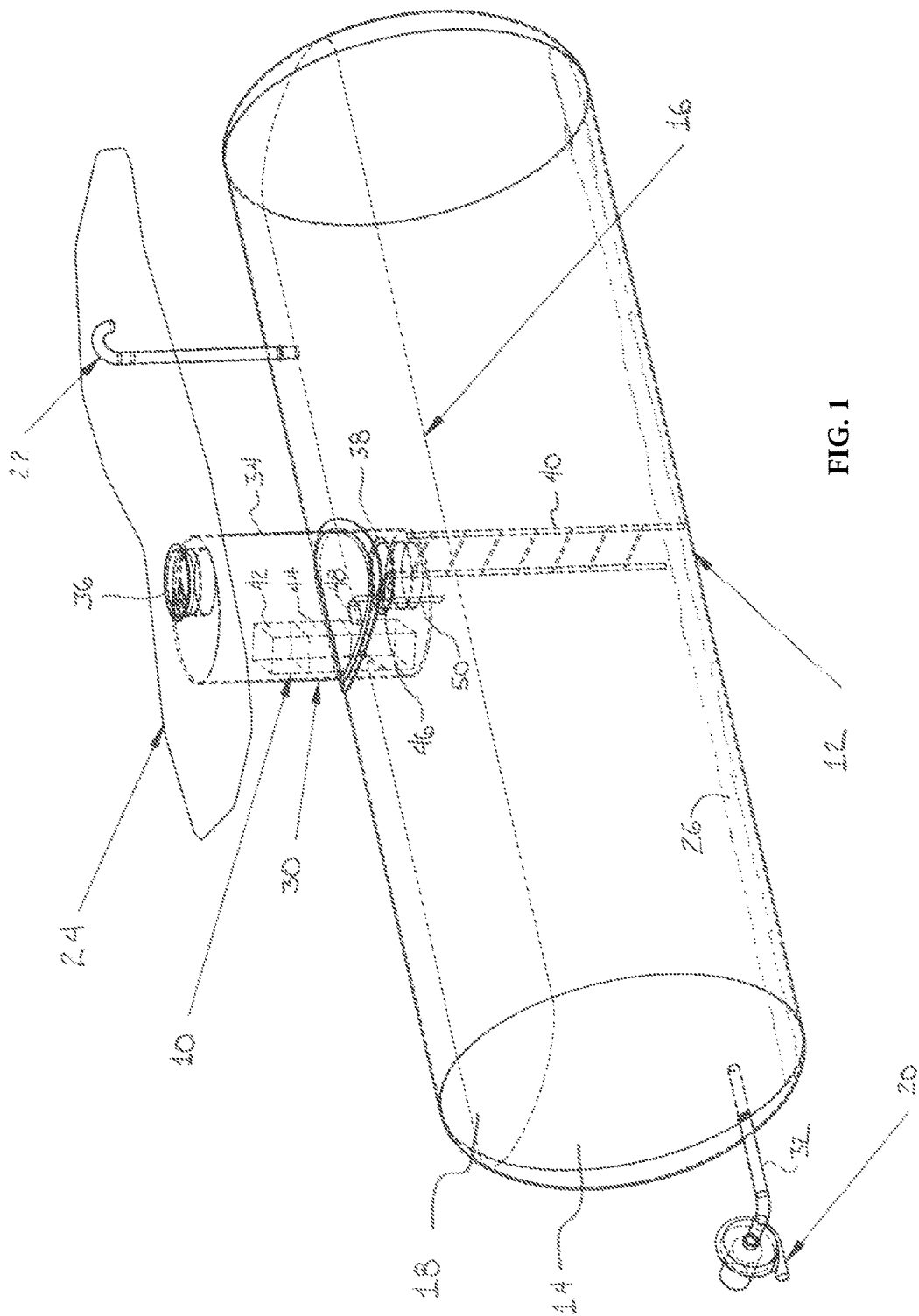
FIG. 1 is a perspective view of a system for inhibiting water contamination in a fuel holding tank in accordance with an aspect of the present invention shown embodied in connection with an underground fuel holding tank.

The present invention will now be described with reference to the accompanying figures, wherein the numbered elements in the following written description correspond to like-numbered elements in the figures. A system for inhibiting biological contamination growth in a fuel holding tank in accordance with an aspect of the present invention is illustrated at 10 in FIG. 1 in connection with an underground fuel tank 12 that contains biodiesel fuel 14. Although shown and descried in FIG. 1 in connection with an underground tank, it should be appreciated that the system is applicable to fuel tanks that are disposed above ground.

Tank 12 includes a fuel level 16 above which an air pocket 18 is located. As fuel 14 is removed from tank 12, such as being pumped out by pump 20, outside air is drawn into tank 12 through vent 22 that projects above ground level 24 to replace the volume of fuel 14 removed from tank 12. In particular climates the outside air that is drawn in will be warmer than the air within air pocket 18 due to the cooling effect of the ground, including by as much as 30 to forty degrees Fahrenheit, where the air that is drawn in may also have significantly higher relatively humid air. Upon the warmer air being drawn into the tank 12, water or moisture in the air can condense out due to the cooling action on the air, which can particularly occur in environments involving higher outside humidity levels. The water or moisture formed by condensation may line the tank 12 surrounding the air pocket, as well as condense on the fuel 14 itself. Still further, entrained water may be present within biodiesel fuel as a byproduct of production of the fuel. The amount of water entrained in fuel 14 is subject to fuel temperature. Once water saturation has occurred, temperature variations can cause some water to precipitate out of suspension. Due to the relative higher density of the water as compared to fuel 14, the non-suspended water may separate and puddle at the bottom of tank 12, with such a layer of liquid contamination 26, including water, shown in FIG. 1. The presence of water in tank 12 interacting with biodiesel fuel 14 promotes the formation of biological growth contamination within tank 12, such as in the form of microbes, mold, mildew, or the like, primarily at the interstitial layer between water 26 and fuel 14, or may even be intermixed with water 26 to form biological contamination therein. The water thus comprises a liquid contaminate within tank 12. Such biological growth contamination degrades the fuel 14 for its intended purpose, and can damage equipment, such as vehicle engines, that use the fuel 14, as well as the piping and pumping systems of tank 12.

Accordingly, as discussed in detail below, system 10 provides a dry air supply assembly 30 that pumps dried air into air pocket 18, whereby air is discharged out of tank 12, such as out of vent 22. The introduction of dry air into tank 12 removes not only moisture laden air that would otherwise be drawn into tank 12, but operates to evaporate liquid water contained within tank 12. This includes drawing water that is suspended or contained within the fuel 14 out of the fuel 14 by the presence of dry air in air pocket 18, where the water will evaporate into the dry air of air pocket 18 and be discharged out of vent 22. For example, the presence of dry air in air pocket 18 may also cause water 26 to be drawn up through fuel 14 to evaporate into the dry air and be discharged out of tank 12. Still further, the dried air, including through mixing the fuel as discussed below, may promote the removal of entrained water in the fuel, such as by drying the fuel with dried air.

In the illustrated embodiment of FIG. 1, tank 12 comprises an underground tank used to hold biodiesel fuel 14 that typically is sized to hold approximately 100,000 gallons, where tank 12 may be used to fuel multiple vehicles, such as at a military base supporting military vehicles including trucks, tanks and other equipment. Piping 32 connected at a generally lower portion of tank 12 is operatively connected with pump 20 to remove fuel 14 from tank 12 and pump it above ground level 24, such as to one or more separate fuel pumps (not shown) used to supply vehicles. Tank 12 further includes a manway 34 with an upper hatch assembly 36 disposed above ground level 24, as well as a lower access port configured as a hatch assembly 38 to enable access into tank 12, where tank 12 may further include a ladder 40 to enable entry into tank 12 for periodic cleaning and interior inspection purposes.

In the illustrated embodiment, dry air supply assembly 30 is mounted or attached to the interior of manway 34 and includes an air compressor 42, an air dryer 44, a control or controller 46, and a regulator 48. In operation, air is drawn into manway 34 through upper hatch 36, such as through a vent or opening in upper hatch assembly 36, or through a portion of manway 34 extending above ground 24, by air compressor 42, where power is supplied to air compressor 42 such as via manway 34. Air compressor 42 then operates to compress the air and supply it to dryer 44. Dryer 44 then operates to dry the air, such as to a level of approximately 100 to 200 parts per million (ppm) water content by weight, or even to approximately 70 to 80 or 100 ppm water content by weight. In the illustrated embodiment, dryer 44 may be a membrane dryer, or a regenerative desiccant dryer having pellets that electrostatically cling with moisture in the air, wherein a regenerative desiccant dryer is able to internally remove the attracted moisture. Such dryers may be configured as or from a PNEUDRI compressed air desiccant dryer supplied by Parker Hannifin Corporation, a DHW series desiccant dryer supplied by SPX Corporation, or a dryer supplied by Reading Technologies Inc., of Reading, Pa. Alternative air dryers, however, may be employed. A membrane dryer consists of a superfine filter through which even evaporated water may not pass. Such dryers may be supplied, for example, by Kaeser Compressors, Inc. of Fredericksburg, Va., the Parker Balston division of Parker Hannifin Corp., or Pentair Engineered OEM Solutions of St. Paul, Minn.

Regulator 48 in turn is connected to dry air supply line or piping 50 that delivers the dried air into the interior of tank 12, with piping 50 being plumbed or fitted at lower hatch assembly 38 to deliver the dried air to air pocket 18. Control 46, which may comprise a computer or processor based controller, operates to selectively activate compressor 42 and/or air dryer 44, and/or may operate valves to selectively enable air flow. Regulator 48, or another component, limits the supply pressure of the dried air into tank 12 to a relatively low pressure that is higher than atmospheric pressure. For example, regulator 48 may supply dried air into tank at approximately one psig or less, where psig is gage pressure and refers to pressure in pounds above standard atmospheric pressure.

Although dry air supply assembly 30 is shown in the illustrated embodiment to incorporate a single air compressor, dryer, control and regulator, it should be appreciated that an air supply assembly may be alternatively constructed within the scope of the present invention, including to include multiple air compressors, dryers, controls and/or regulators. Still further, multiple such dry air assemblies may be employed with a given tank depending on size and/or other parameters. For example, tanks larger or smaller than tank 12 discussed above may be equipped with such a system for inhibiting biological contamination growth in accordance with the present invention.

In operation, control 46 may cause dried air to be delivered into tank 12 under various operational settings. For example, control 46 may operate dry air supply assembly 30 continuously, periodically, or even in response to particular conditions detected via sensors, such as temperatures detected by temperature gauges or humidity levels detected by humidity sensors. It should be appreciated that although tank 12 is shown located underground, that a similarly configured tank may be installed above ground for holding fuel, with system 10 being used with such an above ground tank.

Figure 2:
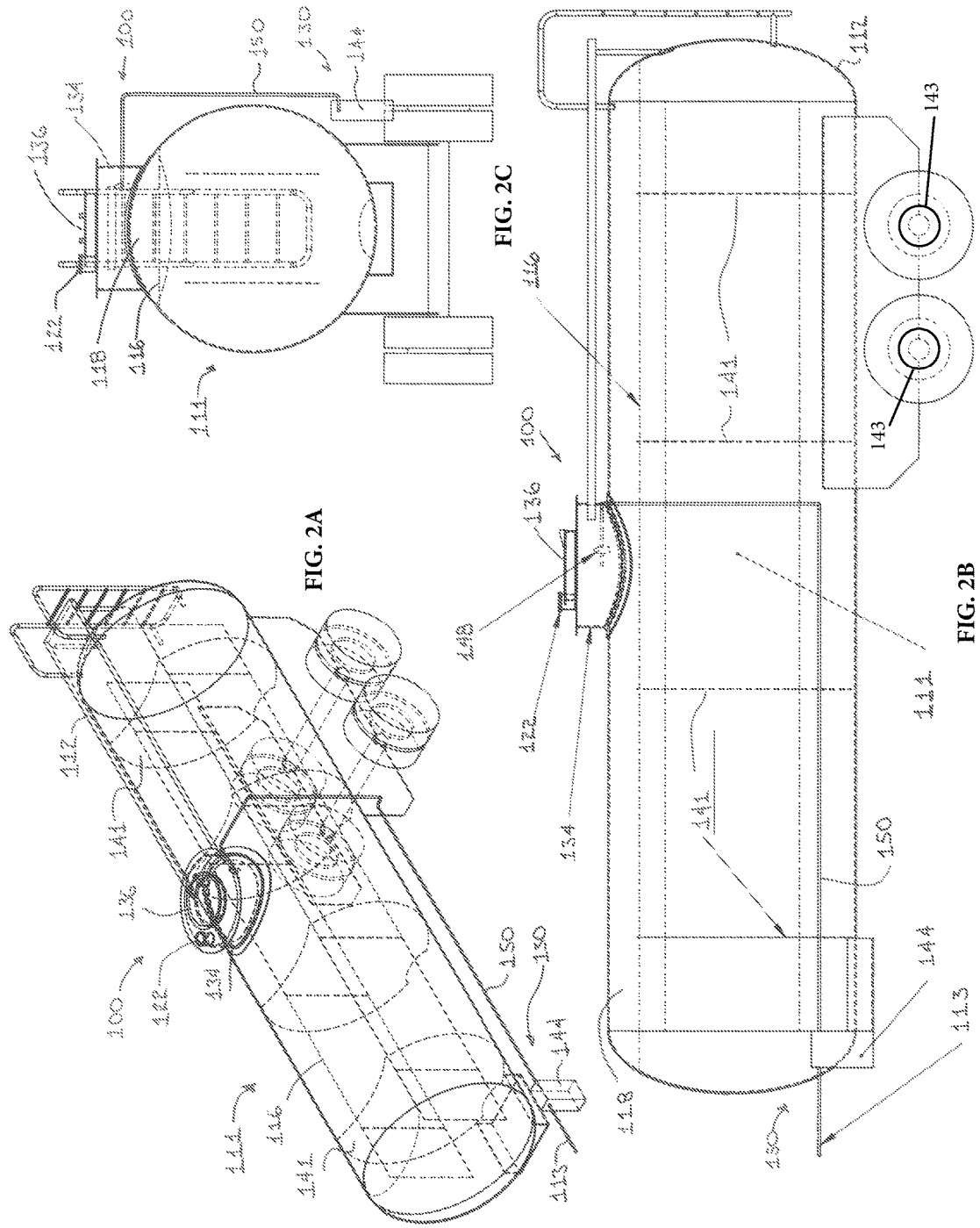
FIG. 2A is a perspective view of another system for inhibiting water contamination in a fuel holding tank in accordance with another aspect of the present invention shown embodied in connection with an over the road fuel tank trailer.
FIG. 2B is a side elevation view of the fuel tank trailer of FIG. 2A.
FIG. 2C is a front end elevation view of the fuel tank trailer of FIG. 2A.

Referring now to FIGS. 2A-2C, an alternative system for inhibiting biological contamination growth in a fuel holding tank in accordance with an aspect of the present invention is illustrated at 100 in connection with a wheeled fuel tank trailer 111 that incorporates a transportable fuel tank 112 that contains biodiesel fuel 114. Fuel tank trailer 111 is configured to be hauled by a truck, such as a truck 311 (FIG. 4), to transport fuel 114 to another tank, such as tank 12 of FIG. 1, or may be used to directly and remotely fuel vehicles. Trailer 111 includes wheels, a king pin for connection to the truck, and includes an access port configured as a manway 134 with a hatch 136, where fuel may be supplied to tank 112 through hatch 136. A vent 122 into the interior of tank 112 is additionally provided at manway 134. Tank 112 additionally includes a ladder 140, as well as interior baffles 141 that limit inertial movement of fuel 114 within tank 112.

Figure 4:
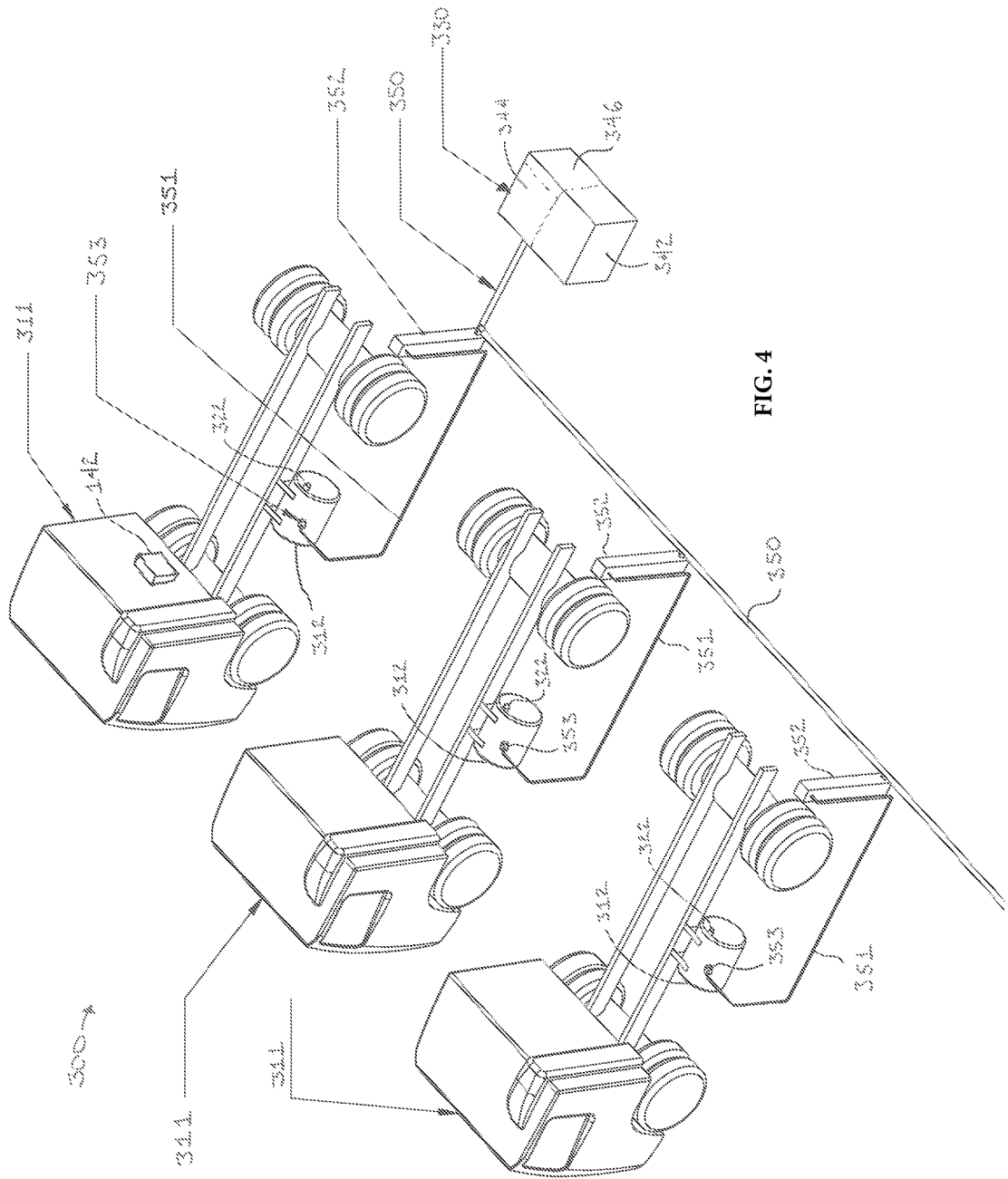
FIG. 4 is an overhead perspective view of another system for inhibiting water contamination in a fuel holding tank in accordance with another aspect of the present invention shown embodied in connection with a vehicle fleet.

In the illustrated embodiment, system 100 includes a dry air supply assembly 130 that incorporates a compressed air supply line 113, which may be a flexible line fed with compressed air delivered or supplied from the truck that provides compressed air to air dryer 144. Such compressed air may, for example, be supplied to dryer 144 by the same source for operating air brakes on trailer 111, where air dryer 144 may be a dryer such as dryer 44 discussed above. As shown in FIG. 4, such a compressor 142 may be mounted to truck 311. A dry air supply line or piping 150 extends from air dryer 144 into tank 112 at manway 134, with dry air supply line 150 including a flow and pressure regulator 148 to control the flow of dry air into tank 112. In particular, an air pocket 118 is located above the fuel level or fuel line 116 within tank 112, with the dry air delivered into the air pocket 118. When so supplied, air is discharged out of vent 122.

Compressor 142 may be an air compressor used to supply compressed air to conventional air brakes 143 of the trailer 111.

Thus, in normal operation, when fuel 114 is drained or pumped from tank 112, outside ambient air is drawn into tank 112 through vent 122. Dry air may then be supplied into tank 112 via dry air supply assembly 130 to evacuate the air that was drawn in, and thereby reduce the moisture and/or humidity level within tank 112 to inhibit the formation and/or growth of biological materials within tank 112, as well as to draw moisture from fuel 114. Similarly, or correspondingly, when tank 112 is filled with fuel 114, a volume of air will be located at air pocket 118, with dry air supply assembly 130 being configured to provide dry air into air pocket 118 to inhibit the formation and/or growth of biological materials within tank 112, as well as to draw moisture from fuel 114.

Figure 3:
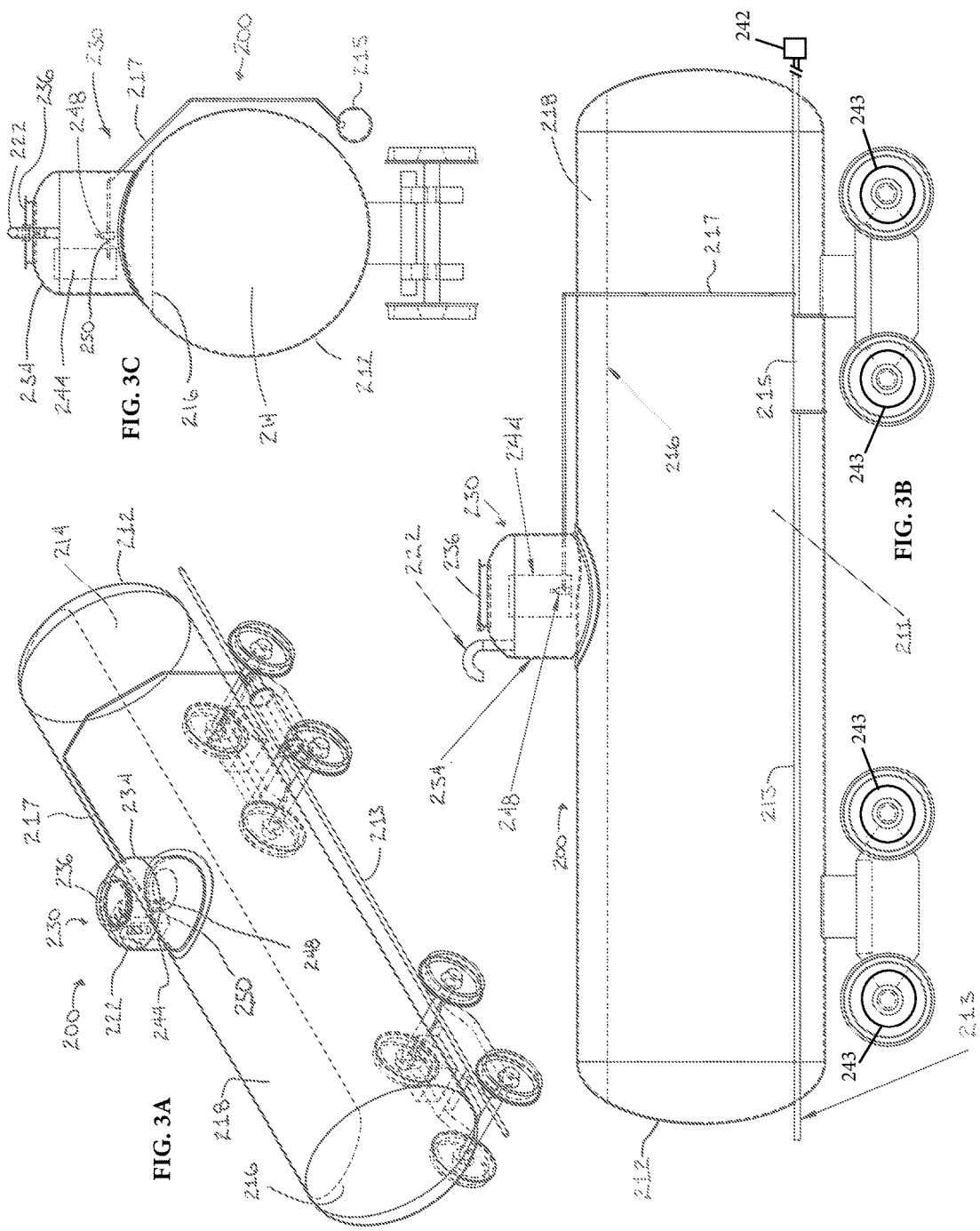
FIG. 3A is a perspective view of another system for inhibiting water contamination in a fuel holding tank in accordance with another aspect of the present invention shown embodied in connection with a locomotive fuel tank car.
FIG. 3B is a side elevation view of the fuel tank car of FIG. 3A.
FIG. 3C is a front end elevation view of the fuel tank car of FIG. 3A.

Referring now to FIGS. 3A-3C, yet another alternative system for inhibiting biological contamination growth in a fuel holding tank in accordance with an aspect of the present invention is illustrated at 200 in connection with a locomotive fuel tank car 211 that incorporates a transportable fuel tank 212 that contains biodiesel fuel 214. Fuel tank car 211 is configured to be hauled by a train (not shown), such as to transport fuel 214 to another tank, such as tank 12 of FIG. 1. Tank car 211 includes wheels, front and rear hitches, and includes an access port configured as a manway 234 with a hatch 236, where fuel may be supplied to tank 212 through hatch 236. A vent 222 into the interior of tank 212 is additionally provided at manway 234.

In the illustrated embodiment, system 200 includes a dry air supply assembly 230 that incorporates a compressed air supply line 213, where the compressed air supply line 213 may be the same line used to supply compressed air from an air compressor 242 to conventional brakes 243 (FIG. 3B) of tank car 211. Alternatively, the compressed air supply line 213 may be plumbed to or correspondingly supplied compressed air with the air brake line of the tank car 211. The compressed air supply line 213 provides air to a compressed air storage tank 215, with a subsequent compressed air supply line 217 fitted to line 213 extending to manway 234, with the compressed air supply line 217 delivering or supplying air to an air dryer 244 located within manway 234. Air dryer 244 may be a dryer such as dryer 44 discussed above, and storage tank 215 may retain a volume of compressed air at approximately 60-90 psi. It should be appreciated that air compressor 142 for supplying compressed air to the air dryer for fuel tank 112 may likewise be a compressor used to supply compressed air to air brakes.

A dry air supply line or piping 250 extends from air dryer 244 into tank 212 at manway 234, with dry air supply line 250 including a flow and pressure regulator 248 to control the flow of dry air into tank 212. In particular, an air pocket 218 is located above the fuel level or fuel line 216 within tank 212, with the dry air delivered into the air pocket 218. When so supplied, air is discharged out of vent 222.

Thus, in normal operation, when fuel 214 is drained or pumped from tank 212, outside ambient air is drawn into tank 212 through vent 222. Dry air may then be supplied into tank 212 via dry air supply assembly 230 to evacuate the air that was drawn in, and thereby reduce the moisture and/or humidity level within tank 212 to inhibit the formation and/or growth of biological materials within tank 212, as well as to draw moisture from fuel 214. Similarly, or correspondingly, when tank 212 is filled with fuel 214, a volume of air will be located at air pocket 218, with dry air supply assembly 230 being configured to provide dry air into air pocket 218 to inhibit the formation and/or growth of biological materials within tank 212, as well as to draw moisture from fuel 214.

Referring now to FIG. 4, yet another alternative system for inhibiting biological contamination growth in a fuel holding tank in accordance with an aspect of the present invention is illustrated at 300 in connection with a vehicle fleet comprising multiple vehicles 311 that each incorporate a fuel tank 312 containing biodiesel fuel 311 for operation of the vehicles 311. In the illustrated embodiment vehicles 311 are shown as trucks with a single tank 312, where tanks 312 comprise side mounted tanks with a cap and a vent 322. It should be appreciated, however, that each vehicle 311 may include additional tanks, or alternatively configured tanks, including as to the location and mounting of the tanks and the vents on the tanks, for example. This includes having vents that are located elsewhere on the vehicle fuel system. Still further, although multiple vehicles 311 are illustrated, with those vehicles 311 illustrated as trucks, it should be appreciated that one or more vehicles may be supplied with dry air in the context of the present invention, including one or more alternative vehicles, such as tanks, automobiles, and the like.

In the illustrated embodiment, system 300 includes a dry air supply assembly 330 that includes a compressor 342, a dryer 344, a control 346, and a regulator (not shown), where dryer 344 may be a dryer such as dryer 44 discussed above. A dry air supply line or piping 350 extends from assembly 330, with the supply line 350 comprising a manifold for delivery of dry air to the vehicles 311. As shown, supply line 350 feeds into individual air supply posts 352, with dry air supply lines 351 extending out of posts 352.

In the illustrated embodiment, air supply lines 351 are flexible air lines fitted to caps 353, such as by air fittings, with the caps 353 configured to be connected to tanks 312, such as via threaded engagement to tanks 312. Lines 351 thus each include a cap 353. In operation, upon one or more vehicles 311 being parked at the fleet facility, an individual may remove the conventional cap for a tank 312 and replace it with the cap 353 to which line 351 is connected. Dry air supplied through lines 351 is then supplied into tanks 312 to evacuate air within the tanks 312 through vents 322 of the tanks 312. Posts 352 may be supplied with a switch or valve to activate the flow of dry air, and/or may include a regulator to control the amount of flow. The supply of dry air into tanks 312 will thereby reduce the moisture and/or humidity level within tanks 312 to inhibit the formation and/or growth of biological materials within tanks 312, as well as to draw moisture from fuel within the tanks 312.

Figures 5, 5A:
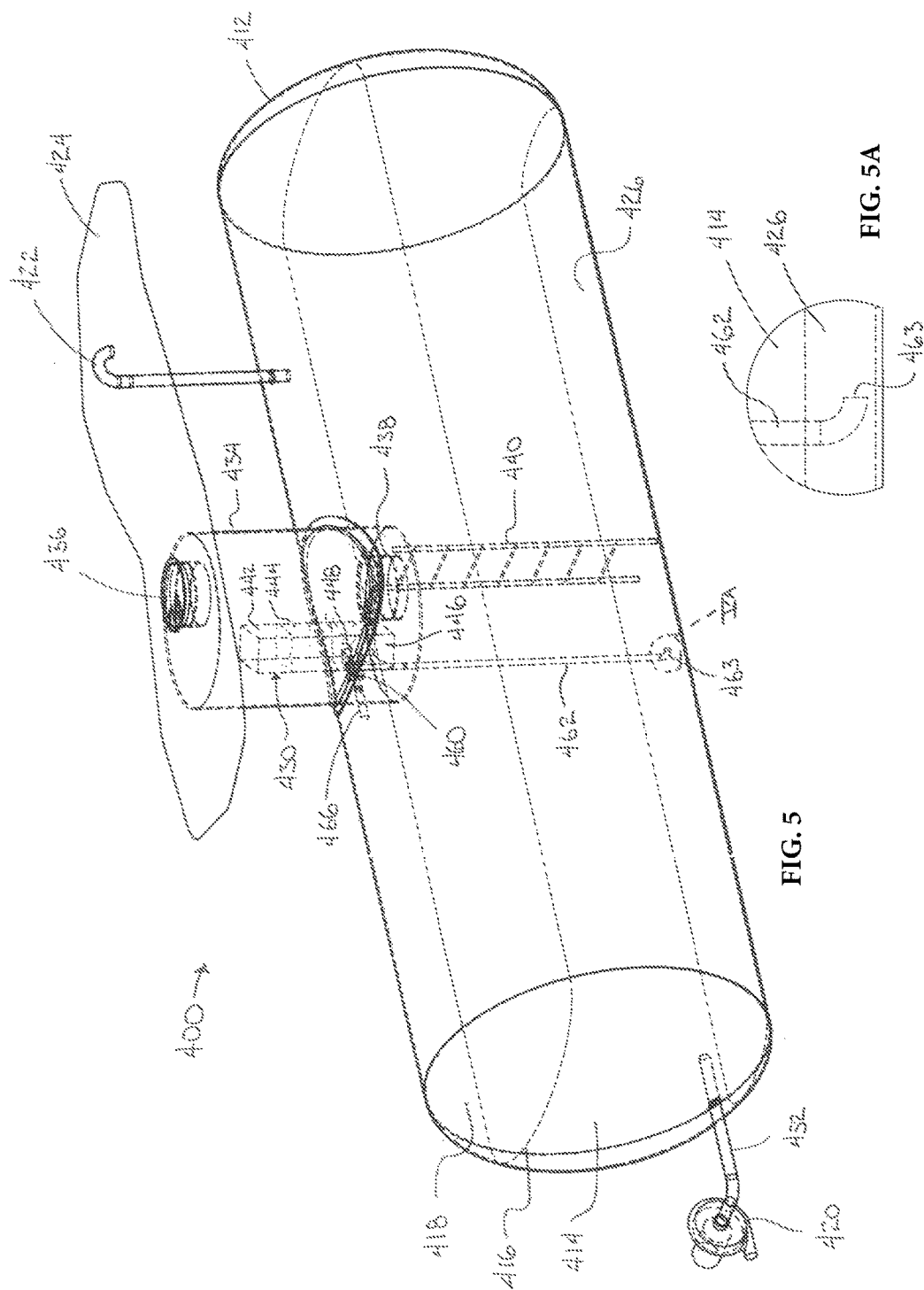
FIG. 5 is a perspective view of another system for inhibiting water contamination in a fuel holding tank in accordance with a further aspect of the present invention shown embodied in connection with an underground fuel holding tank.
FIG. 5A is a close-up view of an intake portion of the system of FIG. 5.
Figure 7:
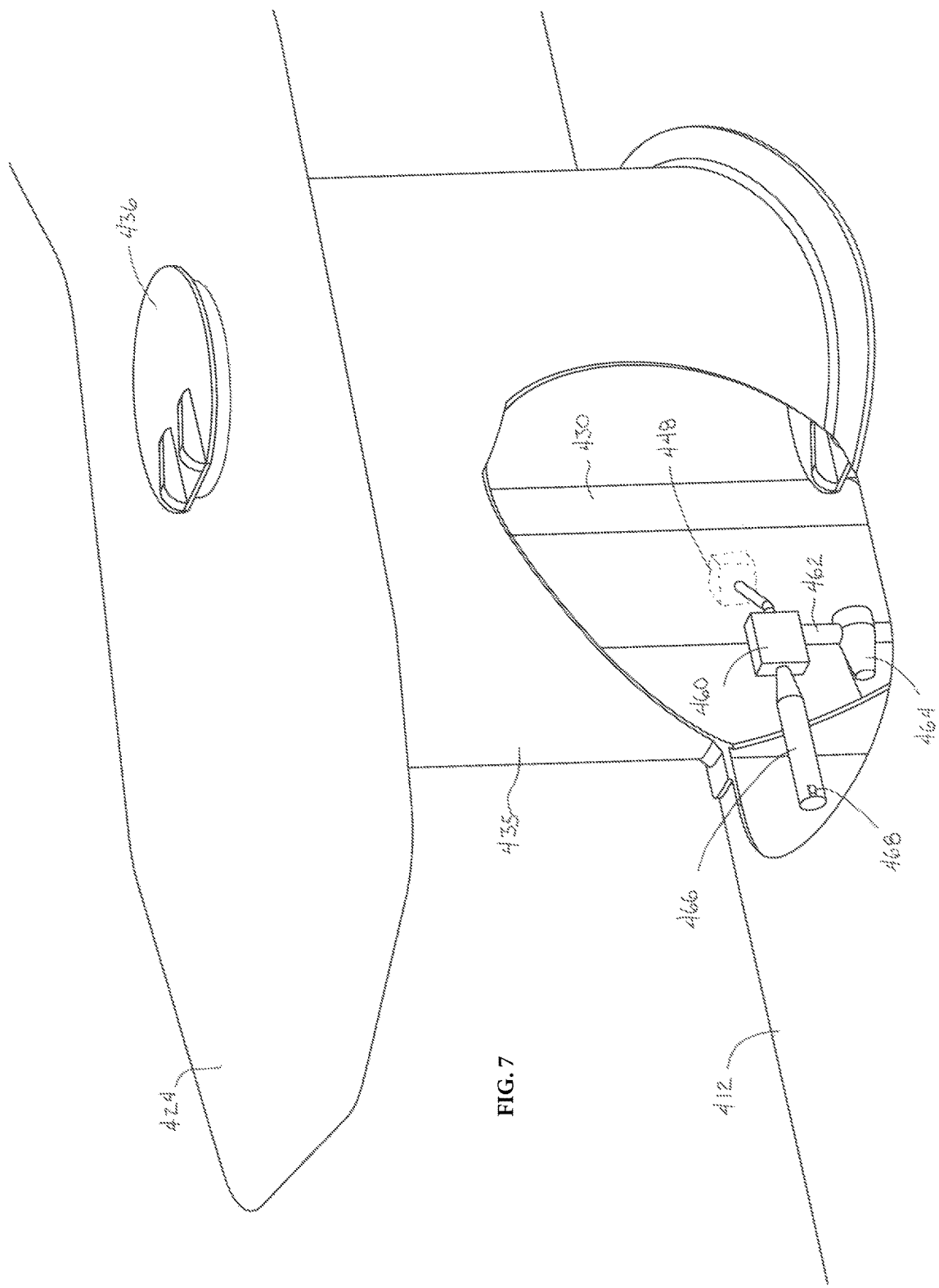
FIG. 7 is a partial perspective view of the system of FIG. 5 with portions removed for clarity.

Referring now to FIGS. 5-7, an alternative system for inhibiting biological contamination growth in a fuel holding tank in accordance with a further aspect of the present invention is illustrated at 400 in connection with an underground fuel tank 412 that contains biodiesel fuel 414. System 400 includes various similar features and components with system 10 discussed above, with the similar components of system 400 being identified with "400" added to the like reference numerals of system 10. It should be appreciated that due to the similarity of system 400 with system 100, not all of the similar components and features are discussed with respect to the system of FIGS. 5-7. System 400, however, as discussed in more detail below, includes an internal fluid pump for raising water that has settled into the bottom of tank 412 to the surface of the fuel 414 to aid in and promote evaporation of the water from tank 412.

Tank 412 includes a fuel level 416 above which an air pocket 418 is located. As fuel 414 is removed from tank 412, such as being pumped out by pump 420, outside air is drawn into tank 412 through vent 422 that projects above ground level 424 to replace the volume of fuel 414 removed from tank 412. As noted, water or moisture formed by condensation may line the tank 412 surrounding the air pocket 418, as well as condense on the fuel 414 itself. Due to the relative higher density of the water as compared to fuel 414, the water may separate and disperse to the bottom of tank 412, within a layer of liquid contaminate 426 residing in the bottom of tank 412 shown in FIGS. 5 and 6. Water may additionally be entrained within the fuel 414, such as from production of fuel 414 or fuel 414 being exposed and electrostatically attracted to water.

System 400 provides a dry air supply assembly 430 that pumps dried air into air pocket 418, whereby air is discharged out of tank 412, such as out of vent 422. Piping 432 connected at a generally lower portion of tank 412 is operatively connected with pump 420 to remove fuel 414 from tank 412 and pump it above ground level 424, such as to one or more separate fuel pumps (not shown) used to supply vehicles. Tank 412 further includes a manway 434 with an upper hatch assembly 436 disposed above ground level 424, as well as a lower access port configured as a hatch assembly 438 to enable access into tank 412, where tank 412 may further include a ladder 440 to enable entry into tank 412 for periodic cleaning and interior inspection purposes.

In the illustrated embodiment, dry air supply assembly 430 is mounted or attached to the interior of manway 434 and includes an air compressor 442, an air dryer 444, a control or controller 446, and a regulator 448.

In operation, air is drawn into manway 434 by air compressor 442, such as through a vent or opening in upper hatch assembly 436, or through a portion of manway 434 extending above ground 424, where power is supplied to air compressor 442 such as through or to manway 434. Air compressor 442 then operates to compress the air and supply it to dryer 444, which in turn operates to dry the air, such as to a level of approximately 100 to 200 parts per million (ppm) water content by weight, or even to approximately 70 to 80 or 100 ppm water content by weight. As discussed above, dryer 444 may be a membrane dryer, or a regenerative desiccant dryer having pellets that electrostatically cling with moisture in the air, wherein a regenerative desiccant dryer is able to internally remove the attracted moisture, or an alternative air dryer may be employed. A membrane dryer will operate to filter out water in the form of moisture in the air.

System 400 further includes a fluid pump 460 that is configured as a pump referred to as an injector or ejector or eductor type pump. High pressure, dried air is supplied from regulator 448 of dry air supply assembly 430 to pump 460 through pipe or tube 450. Pump 460 is additionally connected with an inlet or down pipe or tube operating as a suction line 462 having an open end 463 at the bottom of tank 412 that is positioned within water 426 that has settled in tank 412. In operation, when high pressure, dried air is delivered through tube 450 into pump 460, water from the water layer 426 is drawn into open end 463 and up suction line 462, such as by a Venturi effect, and then discharged out of a nozzle or discharge port, pipe or output line 466 attached to pump 460 such that both high pressure dried air and water are sprayed into the air pocket 418 above the fuel 414. In the illustrated embodiment, suction line 462 extends through a bottom wall 433 of manway 434 and discharge line 466 extends from pump 460 through a sidewall 435 of manway 434. Suction line 462 may optionally include a filter 464 positioned between open end 463 and fluid pump 460, with filter disposed in manway 434 and operative to filter fluid drawn-up through suction line 462, such as filtering out biologically formed sludge.

Fluid pump 460 thus promotes the evaporation of water within tank 412, including puddled water 426 at the bottom of tank 412 by drawing the water 426 up and exposing it directly to dried air from dried air assembly 430. Fluid pump 460 may also create a frothing effect at the surface of fuel 414 as a result of spraying the liquid and high pressure air out of discharge line 466. This includes when all of the denser water 426 that has separated and settled to the bottom of tank 412 has been completely drawn up by pump 460 through suction line 462 such that fuel 414 is then drawn into open end 463 up through suction line 462 and is discharged out of discharge line 466 by pump 460. The presence of a froth layer on the top surface of fuel 414 will not impact the ability to use fuel 414 from tank 412 because pipe 432 is connected at a lower portion of tank 412 to allow fuel 414 to be removed from tank 412 by pump 420. Fluid pump 460 also promotes the elimination of entrained water within fuel 414 by the introduction of the dried air through the fuel. That is, the dried air has an increased electrostatic attraction to water molecules than fuel molecules such that the dried air promotes the expulsion of the water molecules.

Discharge line 466 may additionally be supplied with a sensor 468, such as at or adjacent the outlet of discharge line 466, for detecting the difference between a fuel froth ejection/spray from the discharge line 466 and a water froth/spray from the discharge line 466. The sensor 468 may be integrated with controller 446 to alter operation of fluid pump 460 upon detection that water is no longer being drawn up through suction line 462. That is, upon sensor 468 detecting that instead of water being drawn up through suction line 462, it is determined that fuel is being drawn up through pipe 462. Sensor 468 may be configured to detect a change in temperature, pressure, flow, density and/or an electrical property of the spray being discharged from discharge line 466. Controller 446 may be used to stop operation of fluid pump 460, or reduce the flow through fluid pump 460. For example, dried air may still be provided into air pocket 418, with flow through pipe 462 being restricted. It should be appreciated that fluid pump 460 may continue to be used even after a determination via sensor 468 and controller 446 that water is no longer being drawn through pipe 462 such that fuel 414 continues to be drawn up pipe 462 and ejected out of discharge line 466 via the flow of high pressure, dried air through fluid pump 460. For example, the flow rate of the dried air may be reduced to accommodate the pumping of fuel 414 through the fluid pump 460. Such operation may be continued as a desirable way to promote the drying out of the fuel 414 by mixing with the high pressure dried air.

A sensor for detecting the change in flow from water to fuel may alternatively or additionally be positioned in or at suction line 462 in front of fluid pump 460. Still further, pressure sensors may be positioned on either side of filter 464 to detect when filter 464 is clogged, where the signals from the pressure sensors are provided to controller 446 and a detection of a clog is determined by a predetermined difference in pressure readings between the pressure sensors. The system controller 446 may then transmit signals, such as wirelessly or by a wired connection to another computer device, to alert operators to the clogged condition.

Although fluid pump 460 is shown in the illustrated embodiment as used in connection with an underground fuel tank 412, it should be appreciated that fluid pump 460 may also be used with alternative tanks, such as a fuel tank trailer or a fuel tank car. Still further, a fluid pump supplied with high pressure dried air may desirably be employed with newly produced biodiesel fuel in a holding tank to froth the fuel with the high pressure dried air and thereby promote the drying out or reduction in the water content of the fuel. The fluid pump in such an embodiment may be used to transfer the fuel from one tank to another tank in this method. That is, a nozzle connected to or associated with the fluid pump may be directed to discharge the fuel frothed with dried high pressure air into another tank. Newly produced biodiesel fuel is inherently saturated with moisture such that handling with a fluid pump provided with high pressure dried air as the motive fluid may beneficially be used to remove or extract water from the biodiesel fuel.

Figure 8:
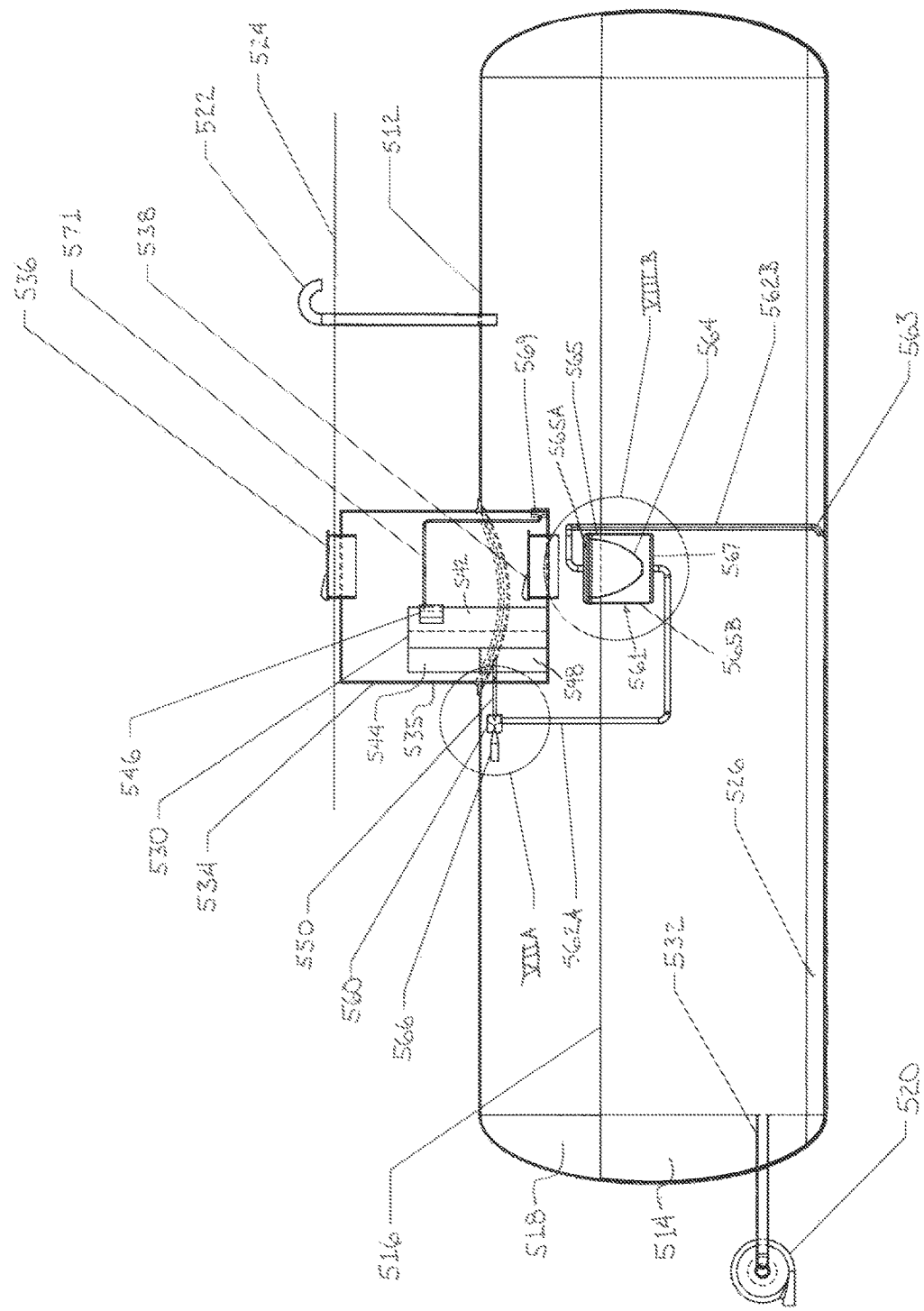
FIG. 8 is a side elevation view of another system for inhibiting water contamination in a fuel holding tank in accordance with yet a further aspect of the present invention shown embodied in connection with an underground fuel holding tank.

Referring now to FIGS. 8, 8A and 8B, a further alternative system for inhibiting biological contamination growth in a fuel holding tank in accordance with the present invention is illustrated at 500 in connection with an underground fuel tank 512 that contains biodiesel fuel 514. System 500 includes various similar features and components with system 400 discussed above with respect to FIGS. 5-7, with the similar components of system 500 being identified with "100" added to the like reference numerals of system 400. It should be appreciated that due to the similarity of system 500 with system 400, not all of the similar components and features are discussed with respect to the system of FIGS. 8-8B. System 500, as discussed in more detail below, also includes an internal fluid pump 560 for raising the contaminate 526, which comprises water and may also include other contaminates, such as biological contamination, that has settled into the bottom of tank 512 to the surface of the fuel 514 to aid in and promote evaporation of the water contaminate 526 from tank 512, and additionally includes a filter assembly 561 through which the contaminate 526 passes to remove contaminates suspended therein.

Tank 512 includes a fuel level 516 above which an air pocket 518 is located. As fuel 514 is removed from tank 512, such as being pumped out by pump 520, outside air is drawn into tank 512 through vent 522 that projects above ground level 524 to replace the volume of fuel 514 removed from tank 512. Water or moisture formed by condensation may line the tank 512 surrounding the air pocket 518, as well as condense on the fuel 514 itself, with the water separating and dispersing to the bottom of tank 512 due to the relative higher density of the water as compared to fuel 514. The water then collects to form a layer of liquid contaminate 526 at the bottom of tank 512, which may additionally include contaminates, such as biological contaminates, interspersed or suspended therein, or located at the interstitial layer between fuel 514 and liquid contaminate 526.

System 500 provides a dry air supply assembly 530 that pumps dried air into air pocket 518, whereby air is discharged out of tank 512, such as out of vent 522. Piping 532 connected at a generally lower portion of tank 512 is operatively connected with pump 520 to remove fuel 514 from tank 512 and pump it above ground level 524. Tank 512 further includes a manway 534 with an upper hatch assembly 536 disposed above ground level 524, as well as a lower access port configured as a hatch assembly 538 to enable access into tank 512. In the illustrated embodiment, dry air supply assembly 530 is mounted or attached to the interior of manway 534 and includes an air compressor 542, an air dryer 544, a control or controller 546, and a regulator 548.

Air is drawn into manway 534 by air compressor 542, such as through a vent or opening in upper hatch assembly 536, or through a portion of manway 534 extending above ground 524, where power is also supplied to air compressor 542 such as through or to manway 534. Air compressor 542 then operates to compress the air and supply it to dryer 544, which in turn operates to dry the air, such as to a level of approximately 100 to 200 parts per million (ppm) water content by weight, or even to approximately 70 to 80 or 100 ppm water content by weight. Dryer 544 may be a desiccant dryer, or a regenerative desiccant dryer having pellets that electrostatically cling with moisture in the air, wherein a regenerative desiccant dryer is able to internally remove the attracted moisture, or an alternative air dryer may be employed.

Fluid pump 560 is configured as an injector or ejector or eductor type pump, with high pressure, dried air supplied from regulator 548 of dry air supply assembly 530 to pump 560 through supply line, formed as a pipe or tube 550. Pump 560 is additionally connected with an inlet or down pipe or tube operating as a suction line 562A connected at one end to pump 560 and at an opposite end to a housing 565 of filter assembly 561. An additional down pipe or tube operating as a suction line 562B is also connected to housing 565 and includes an opposite open end 563 at the bottom of tank 512 to be positioned within liquid contaminate 526 that has settled in tank 512. Suction lines 562A and 562B thus together define a suction line, with filter assembly 561 being mounted thereto.

Filter housing 565 of filter assembly 561 has a generally cylindrical construction in the illustrated embodiment with one housing portion comprising a removable lid 565A that is securable to another housing portion comprising a body 565B, with filter 564 secured within housing 565. Body 565B forms a solid body such that liquid contained therein does not mix with the remaining fuel 514 within tank 512. Lid 565A is likewise a sold lid whereby a vacuum may be created within housing 565. As shown, suction line 562A connects to a bottom 567 of body 565B, with suction line 562B in turn connecting to lid 565A.

In the illustrated embodiment of system 500, pipe 550 extends through a sidewall 535 of manway 534 with pump 560 being located within tank 512 in the air pocket 518 above fuel level 516. Fluid pump 560 may, for example, be mounted to sidewall 535 of manway 534, or may be mounted to a bracket connected to the interior of tank 512. In operation, when high pressure, dried air is delivered through tube 550 into pump 560, pump 560 generates a vacuum whereby liquid within housing 565 is drawn into suction line 562A, such as by a Venturi effect, and then discharged out of a nozzle or discharge port, pipe or output line 566 attached to pump 560. The generation of a vacuum within or by pump 560 then in turn generates a vacuum within housing 565 due to lid 565A being secured to body 565B, whereby liquid is drawn into open end 563 and up through suction line 562B and into housing 565 above filter 514. As such, the liquid within housing 565 may comprise fuel 514 and/or liquid contaminate 526, depending on the amount of liquid contaminate 526 within tank 512 and being drawn up line 562B.

Filter 564 comprises a membrane filter that allows liquid to pass there through, but traps solidified contaminates drawn up through suction line 562B, such as biological contamination or biologically formed sludge. Filter 564 may, for example, comprise a fine mesh or paper like filter having a conical shape, with the filter 564 supported at an upper part of body 565B as shown in the illustrated embodiment. Thus, liquid contaminate 526 drawn up through suction line 562B will pass through filter 564 within housing 565 as the liquid contaminate 526 is drawn into suction line 562A. At chosen intervals, the contents/appearance/weight of the filter 564 can be assessed by maintenance personnel, such as by removal of lid 565A, with filter 564 being removable via the man-way access 538 without any requirement for entrance into the tank 512 itself.

As noted, liquid drawn up from within housing 565 by pump 560 is discharged from discharge line 566, whereby both high pressure dried air and liquid contaminate 526, such as water, are sprayed into the air pocket 518 above the fuel 514. Fluid pump 560 thus promotes the evaporation of water within tank 512, including puddled water forming liquid contaminate 526 at the bottom of tank 512, by drawing the water up and exposing it directly to dried air from dried air assembly 530, with the evaporated water then being discharged from tank 512 through vent 522. Fluid pump 560 may also create a frothing effect at the surface of fuel 514 as a result of spraying the liquid and high pressure air out of discharge line 566. This includes when all of the denser water within liquid contaminate 526 that has separated and settled to the bottom of tank 512 has been completely drawn up by pump 560 through suction lines 562A, 562B such that fuel 514 is then drawn into open end 563 up through suction lines 562A, 562B and is discharged out of discharge line 566 by pump 560. The presence of a froth layer on the top surface of fuel 514 will not impact the ability to use fuel 514 from tank 512 because pipe 532 is connected at a lower portion of tank 512 to allow fuel 514 to be removed from tank 512 by pump 520. Fluid pump 560 also promotes the elimination of entrained water within fuel 514 by the introduction of the dried air through the fuel and above the fuel in pocket 518. That is, the dried air has an increased electrostatic attraction to biodiesel fuel molecules than water molecules such that the dried air promotes the expulsion of the water molecules. Still further, the presence of filter assembly 561 may promote a reduction in the amount of frothing of fuel discharged from pump 560.

As understood from FIG. 8, a humidity sensor 569 is additionally mounted for measuring the humidity level within air pocket 518, with humidity sensor 569 being mounted at manway 534 and connected to controller 546 via wires or wiring 571. When sensor 569 detects a relatively high humidity within pocket 518, controller 546 will cause dry air supply assembly 530 to operate pump 560 at a higher rate to suck up any puddled water forming liquid contaminate 526, whereby the pump 560 will draw the liquid contaminate 526 up and mix it with dried air. At some point, the puddled water forming liquid contaminate 526 will have been drawn up and removed from the bottom of tank 512, but humidity sensor 569 will still show that the air within pocket 518 remains at an elevated moisture state. Subsequently, when the fuel 514 is dried, sensor 569 will indicate that the air within pocket 518 is dry, particularly relative to the prior condition. Controller 546 will then slow down the compressor 542 of dried air assembly 530 to the point that the amount of dry air going to pump 560 is insufficient to draw up any fluid from the bottom of tank 512, including fuel 514 or liquid contaminate 526. The dry air that still moves through pump 560 will slightly over-pressurize tank 512, keeping any moist atmospheric air from entering tank 512 as it is emptied of fuel 514 via fuel pump 520. It should be appreciated that controller 546 may be set to operate based on humidity levels within tank 512 that are preselected and/or adjustable. It should further be appreciated that the rate of operation of fluid pump 560 may be based on the supply rate of dried air from dry air supply assembly 530 to fluid pump 560, such as based on the volume and/or velocity of dry air being delivered thereto. The controller 546 may, for example, adjust the regulator 548 for controlling the supply rate of dried air.

Although fluid pump 560 is shown in the illustrated embodiment as used in connection with an underground fuel tank 512, it should be appreciated that fluid pump 560 may also be used with alternative tanks, such as a fuel tank trailer or a fuel tank car. It should also be appreciated that although tank 512 is shown located underground, that a similarly configured tank may be installed above ground for holding fuel, with system 500 being used with such an above ground tank. Still further, a fluid pump supplied with high pressure dried air may desirably be employed with newly produced biodiesel fuel in a holding tank to froth the fuel with the high pressure dried air and thereby promote the drying out or reduction in the water content of the fuel. The fluid pump in such an embodiment may be used to transfer the fuel from one tank to another tank in this method. That is, a nozzle connected to or associated with the fluid pump may be directed to discharge the fuel frothed with dried high pressure air into another tank. Newly produced biodiesel fuel is inherently saturated with moisture such that handling with a fluid pump provided with high pressure dried air as the motive fluid may beneficially be used to remove or extract water from the biodiesel fuel.

It should be appreciated that the various piping disclosed in the illustrated embodiments may be constructed of one or more tubes or pipes or flexible lines, and may be constructed of plastic or metal. Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A system for supplying dry air to a fuel tank, said system comprising:
   a dry air supply assembly, said dry air supply assembly including an air compressor and an air dryer configured to remove moisture from compressed air supplied from said air compressor to said air dryer;
   a fluid pump, said fluid pump being mounted within the fuel tank above a fuel level, said fluid pump receiving dried air from said air dryer;
   a suction line extending from said fluid pump, said suction line including an open end disposed at a bottom of the fuel tank;
   said fluid pump adapted to receive dried air from said air dryer as a motive force to draw liquid from the bottom of the tank into said opening of said suction line, up said suction line to said fluid pump, and discharge liquid from said fluid pump above the fuel level within the fuel tank.

2. The system of claim 1, further comprising a filter disposed at said suction line, and wherein liquid drawn up said suction line passes through said filter.

3. The system of claim 2, further comprising a filter housing connected with said suction line with said filter being disposed within said filter housing, and wherein said fluid pump generates a vacuum within said filter housing.

4. The system of claim 3, wherein said suction line comprises a first suction line and a second suction line, and wherein said filter housing comprises a first housing portion and a second housing portion, and wherein said first suction line includes said opening and extends to said first housing portion, and wherein said second suction line is connected to said second housing portion and extends to said fluid pump, and wherein said first housing portion is selectively removable from said second housing portion to access said filter.

5. The system of claim 1, further including a controller, and wherein said controller is configured to programmably operate said dry air supply assembly.

6. The system of claim 5, further including a humidity sensor operatively connected with said controller, and wherein said controller operates said dry air supply assembly to provide a first supply rate of dried air to said fluid pump at a first humidity level detected by said humidity sensor and operates said dry air supply assembly to provide a second supply rate of air at a second humidity level detected by said humidity sensor, and wherein said first humidity level is greater than said second humidity level and said first supply rate of dried air is greater than said second supply rate of dried air.

7. The system of claim 6, wherein said first supply rate of dried air is sufficient to draw liquid from the bottom of the tank into said opening of said suction line, up said suction line to said fluid pump, and discharge liquid from said fluid pump, and wherein said second supply rate of dried air is insufficient to draw liquid from the bottom of the tank and discharge the liquid from said fluid pump.

8. The system of claim 1, further including a regulator, said regulator operative to control the flow of dried air from said air dryer to said fluid pump.

9. The system of claim 1, wherein the fuel tank comprises an underground storage tank, and wherein the fuel tank includes a manway forming an above ground access to the fuel tank, and wherein said dry air supply assembly is mounted in said manway.

10. The system of claim 9, further including a supply line extending from said dry air supply assembly to said fluid pump, with said supply line extending through a wall of said manway.

11. The system of claim 9, wherein the manway includes an access port in a bottom of the manway to enable entry to an internal space of the fuel tank, and wherein said system further includes a filter housing connected with said suction line with a filter disposed within said filter housing, and wherein said filter housing is disposed adjacent the access port of the manway whereby the filter housing is accessible through the access port.

12. The system of claim 1, wherein the fuel tank comprises a transportable fuel tank mounted with wheels.

13. The system of claim 12, wherein said air compressor supplies compressed air to brakes of the transportable fuel tank.

14. The system of claim 1, wherein a discharge port is associated with said fluid pump through which a mixture of liquid and dried air is discharged.

15. A method of supplying dry air to a fuel tank, said method comprising:
   compressing air with an air compressor;
   supplying compressed air to an air dryer;
   drying the compressed air with the air dryer, with the air dryer configured to remove moisture from the compressed air to form compressed dried air;
   supplying compressed dried air to a fluid pump located within the fuel tank;

drawing a liquid into the fluid pump; and discharging the liquid and compressed dried air out a discharge port associated with the fluid pump.

16. The method of claim 15, wherein the drawing a liquid into the fluid pump comprises drawing fuel, water, and/or a fuel and water mixture into the fluid pump.

17. The method of claim 15, wherein the fuel tank contains biodiesel fuel.

18. The method of claim 15, wherein the fuel tank comprises an underground fuel tank.

19. The method of claim 15, further comprising:

sensing a humidity level within the fuel tank with a humidity sensor; and controlling the supply of dried air to the fluid pump based on the humidity level within the fuel tank.

20. The method of claim 15, further comprising regulating the flow of dried air to the fuel tank.

\* \* \* \* \*